Sept. 12, 1939.       F. E. WENGER        2,172,897
                         TUBE TESTER
                      Filed May 10, 1937
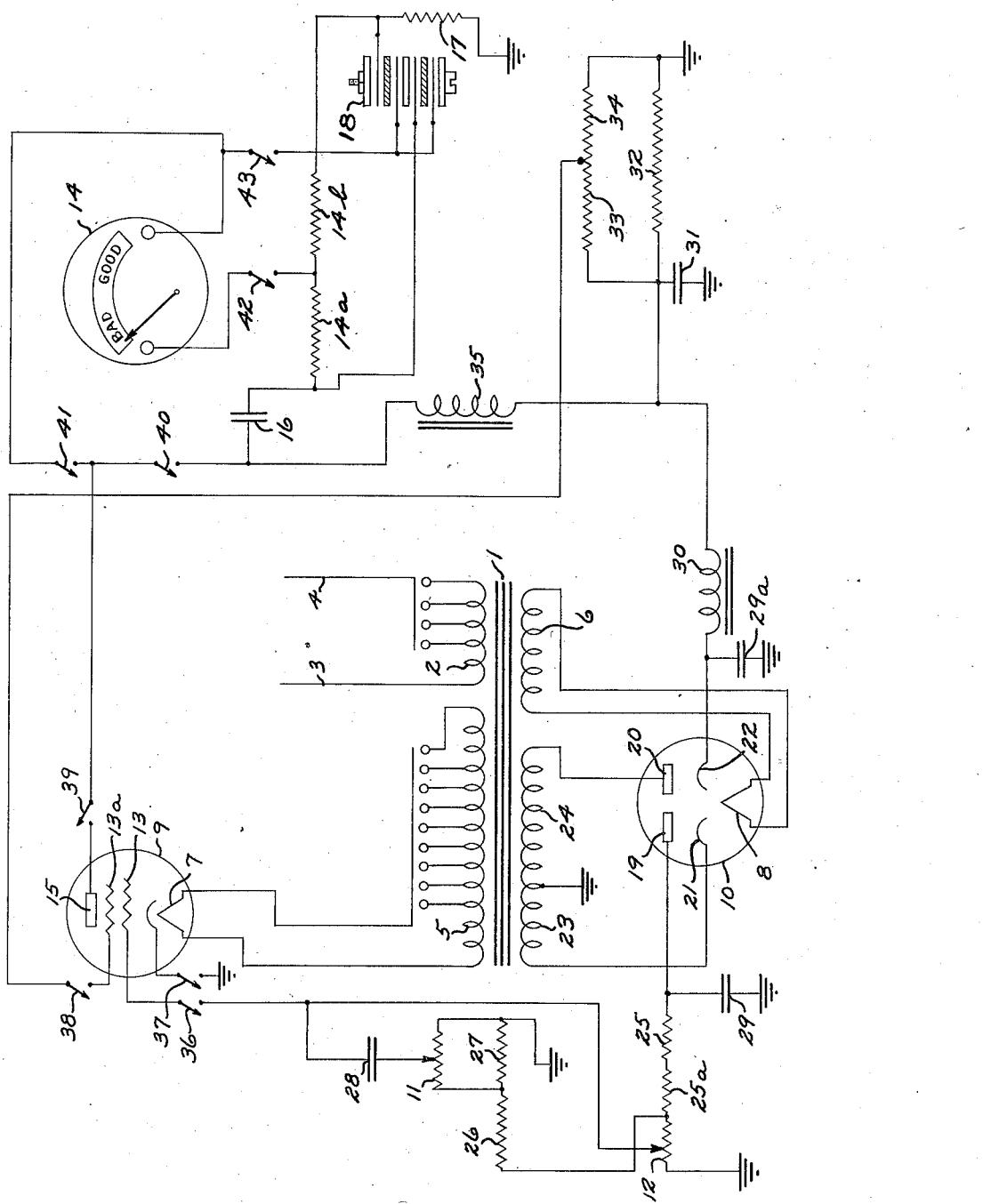
INVENTOR.
FLOYD E. WENGER
BY Toulmin & Toulmin
ATTORNEY.

Patented Sept. 12, 1939

2,172,897

UNITED STATES PATENT OFFICE 2,172,897

TUBE TESTER

Floyd E. Wenger, Bluffton, Ohio, assignor to Ray L. Triplett, Bluffton, Ohio

Application May 10, 1937, Serial No. 141,747

6 Claims. (Cl. 250—27)

This invention relates to electrical testing instruments, and in particular, to instruments for determining the characteristics of electronic tubes.

The primary object of the present invention is to provide a simplified but efficient system for determining the dynamic characteristics of a thermionic device by the comparison method.

Another object is to provide a system of this type in which all of the required potentials, including the direct and alternating potentials and also the test potentials applied to the control grid are obtained from a single source of alternating current and, when necessary, through a single rectifier unit.

The above objects are attained in brief by energizing the tube under test (including the variable potentials applied to the control grid) from a pair of single wave rectifiers arranged in a single bulb and then passing the alternating current component of the plate circuit through a Wheatstone bridge which includes a copper oxide rectifier. The rectified output is applied to a D. C. voltmeter. The system also contemplates the use of a resistor for calibrating the meter; also circuit adjustments by which the system, as a whole, can be calibrated as determined by the voltage and current requirements and measurements of a standard known tube.

In the drawing:

The figure shows a simplified wiring diagram of one embodiment of the tube tester of this invention.

Referring to the drawing in detail, the figure shows the simplified or essential circuit of the tube tester as consisting of a transformer, generally designated 1, with a tapped primary winding 2 connected to the alternating power lines 3 and 4. The transformer 1 is provided with a tapped secondary winding 5 and a secondary winding 6, adapted respectively to supply filament voltage to the filaments 7 and 8 of the tube 9 under test and the rectifier tube 10. The secondary winding 5 is tapped in order to provide the various filament voltages required for the different types of electronic tubes in commercial use. In place of the single rectifier tube 10 a pair of rectifier tubes may be used, in which case the secondary winding 6 would be arranged to supply a filament voltage suitable for both filaments of these tubes.

Variable resistors 11 and 12 are connected to the grid 13 of the tested tube in order to vary the voltage applied thereto, this voltage being a rectified pulsating voltage, as will appear later.

The tested tube 9 may also contain other elements, such as the grid 13a. The output of the tested tube 9 is measured upon the voltmeter 14 connected to the plate 15 thereof. A condenser 16 is connected to the line joining the plate 15 of the tested tube 9 to the voltmeter 14 in order to insure that only required pulsating current will pass, and direct current will be prevented from flowing to the voltmeter 14. A resistor 17 is connected between an end terminal of the rectifier 18 and ground. The opposite terminal of the voltmeter 14 is connected, through the resistances 14a and 14b, to the opposite side of the condenser 16 and grounded beyond the resistance 17 and rectifier 18 connected thereto which is preferably of the multi-disk copper oxide type.

It will be noted from the circuit diagram that the resistances 14a, 14b form two arms of a Wheatstone bridge, the other two of which are formed by the various connections to the disks of the oxide rectifier. The meter 14 is connected across the potential points of the bridge, one of which is constituted of the junction between the resistances 14a, 14b and the other is taken from an intermediate disk of the rectifier.

For furnishing the proper positive voltage for energizing the various elements of the tested tube 9, the single rectifier tube 10 is employed, having a pair of plates 19 and 20, together with a pair of cathodes 21 and 22. The cathode 21 and the plate 19 furnish the negative voltages or bias, and the driving pulsating voltage for energizing any element of the tested tube 9. In this manner the grid bias voltage of the tube tester may be maintained at a constant value, irrespective of the amount of current drawn by the other tube elements, hence, the amplification factor is measured for predetermined and prescribed voltages.

The transformer 1 is further provided with secondary windings 23 and 24, grounded at their junction point. The secondary winding 23 is connected to the cathode 21 for supplying the necessary negative voltage, whereas the winding 24 is a positive secondary winding connected to the plate 20 for supplying the necessary positive voltages of the various types of tested tubes 9. The plate 19 of the rectifier tube 10 is connected, through the resistors 25 and 25a, to the variable resistor 12, their junction point being connected to the resistor 26. The latter is connected to the resistor 27, the variable resistor previously described being bridged around the resistor 27 and grounded therebeyond.

A condenser 28 is arranged between the variable resistor 11 and the grid 13 of the tested tube.

The plate 19, prior to its connection with the resistor 25, is grounded through the condenser 29. The cathode 22 is grounded through a condenser 29a, and therebeyond is connected through the choke 30. Beyond this the circuit is grounded through the condenser 31 and connected therebeyond to the positive voltage divider 32. The latter provides the positive voltage desired, and is bridged by the fixed resistors 33 and 34, the midpoint of which is connected to the grid 13a of the tested tube 9. Beyond this connection with the choke 30 the positive voltage divider 32 is grounded. The choke 30 is likewise connected through the choke 35 to the plate 15 of the tube under test.

In order to control the connections of the different elements of the various tested tubes 9 which may be used, switches 36, 37, 38 and 39 are provided, which can be controlled by a single shaft. Switches 40, 41, 42 and 43 are also provided for power output or emission measurements, as will be explained hereinafter. The use of a choke, as shown, for coupling the tube to the meter permits better impedance matching between the tube under test and the meter for measuring the amplification factor of the tube. It will be understood, however, that other means of coupling can be used, such as transformer or resistance coupling. Thus, the tube tester of the present invention provides for the application of a voltage from a rectified line voltage to the grid 13 of the tube under test.

The amplification factor of the tube 9 under test is obtained in general by comparing its electrical characteristics with the known characteristics of a standard tube. A standard tube of good quality is first connected to the circuit in the position shown by the tube 9 and the switches 36, 37, 38, 39, 40, 42 and 43 are closed. The properly rated voltages are applied to the filament, the plate and the control grid, also to the second grid in case the tube is of the tetrode type and proper adjustments are made on the resistances 11, 12 and 34 to have the meter 14 indicate a good or satisfactory amplification factor. It will be understood that the control voltage for the control grid is obtained from the ripples produced in the rectified alternating current at the rectifier 10 and applied through the resistances 25, 26 and 11 to the control grid. The pulsations of direct current brought about by the potential variations applied to the control grid are passed through the condenser 16 and applied to the bridge circuit, thence passing into the ground through the resistor 17 to complete the circuit back to the cathode 22 of the rectifier 10.

It will be noted that the steady direct current potential is applied to the plate through the choke coil 35, but is prevented from entering the bridge circuit by the condenser 16. The rectifier 18 constitutes two arms of the bridge opposite from the resistances 14a and 14b and serves to rectify the alternating current potentials received through the condenser 16 from the plate circuit of the tube. These rectified potentials are applied to the meter 14. The amplification factor $u$ is the ratio of the change in plate voltage to a change in control electrode voltage in the opposite direction, under the condition that the plate current remains unchanged. Thus, this factor depends directly on the ratio between the changes in control grid voltage and the changes in plate voltage. The meter 14 measures the drop in voltage across the bridge, which voltage is determined by the change in plate voltage due to the voltage pulsations applied to the control grid.

Consequently, if a tube of unknown dynamic characteristics were substituted for the tube of known characteristics and, assuming that the same plate voltage variations were applied to the grid of unknown tube, the voltage indications of the meter 14 represent directly the difference in amplification factor as compared with the factor of the standard tube. The meter can, therefore, be calibrated to read amplification factor directly. It will, of course, be understood that, in determining the unknown characteristics of the tube under test, the adjustments at the resistors 11 and 12 remain unchanged from the position that they assumed when the tube of known characteristics was being tested.

It will be further noted that the position of the resistance 17, connected between the rectifier 18 and ground, is such as to control the current passing through the combined bridge and rectifier circuit. This resistance may, therefore, be used to calibrate the meter 14.

The adjustable tap on the resistors 33, 34, also the resistance condenser network 32, 31 are of a predetermined character and so adjusted as to provide the proper voltage to the auxiliary grid 13a, depending on whether this grid serves the purpose of a screen grid or a secondary emission suppression grid. This voltage should have a value comparable to the rate voltage so that the amplification factor, as found by the meter 14, will represent a factor predicated on proper voltage values.

The amplification factor of the tube is independent of the magnitude of the input voltage over that part of the tube characteristic curve having a uniform slope which occurs where the amplification is without distortion. This portion of the curve is the only useful portion, as far as the audible reproduction of sound is concerned, although not critical where mere signal sounds are amplified rather than musical or vocal sounds. The tube characteristic curve referred to is the graph showing the relationship between the plate current and the grid potential, as is well known to those skilled in the electronic tube art.

Thus the tube tester of this invention measures the amplification factor of a tube at predetermined and prescribed pulsating current signal voltages impressed upon the grid 13 thereof. Accordingly, the conditions under which the tube is tested substantially reproduce those under which the tube is actually used in practice, and an accurate and trustworthy representation of the amplification factor of any tube is quickly and easily measured.

The scale of the voltmeter 14 is preferably calibrated in the so-called "English Reading Scale", which merely indicated by differently colored sections whether the tube is good or bad as regards its amplification factor.

While I have described the operation of my circuit as applied to a determination of the amplification factor, it is apparent that other dynamic characteristics may be found, using the same circuit, for example, mutual conductance and certain detector characteristics of well-known type.

The rectifier tube 10 may be either half-wave or full-wave. For simplicity, it is preferred to use a half-wave rectifier tube, with a limited filter system. Alternatively, however, the filter system can be complete so as to allow very little ripple to be applied to the grid for the direct current bias. Under these conditions, the pulsating voltage for driving the tubes can then be taken from any part of the filter system. It will be understood that the single rectifier tube 10 may be replaced by a pair of rectifier tubes having single plates and single cathodes, although the single tube 10 with the multiple elements is found more convenient.

In case it is desired to give the tube under test so-called "emission tests" rather than a determination of its dynamic characteristics, the switches 40 and 43 are opened and the switches 41 and 42 are closed. The plate current from the tube 9 under test is then free to pass directly through the meter 14, through resistance 14b and resistance 17 to ground. The meter 14 in this case may be a milliammeter and its purpose is to measure the plate current flowing for the various values of current passing through the filament 7 and including saturation current through the tube. It will be understood that the circuit, as adapted for emission tests represents an alternative use and is not necessarily related to the system as described above, which determines the dynamic characteristics of the tube under test.

From the foregoing, it is evident that I have disclosed a system for determining the usual dynamic characteristics of a vacuum tube and in which the alternating plate potential is separated from the direct current plate potential by the use of the condenser 16 so that the rectifier 18 is called on merely to rectify the alternating component of the plate current. Under these conditions, it is obvious that the meter 14 indicates only change in current and is not loaded down with a steady direct current. To this extent, the meter gives a very accurate reading of the current undulations in the plate circuit of the tube under test.

Moreover, it will be further noted that the entire system derives all of its energy from a single alternating current source, namely, the transformer 1 and that the direct current potentials, including the voltage ripple applied to the control grid 13, are derived from a single rectifier 10. Thus, the circuit as a whole, can be self-contained and requires for energization purposes only a single source of alternating potential applied to the condensers 3, 4.

It will be understood that I desire to comprehend within my invention such modifications as come within the scope of the claims and the invention.

Having thus fully described my invention, what I claim as new and desire to secure by Letters Patent, is:

1. A system for testing a tube having a grid and plate, said system comprising a bridge circuit including a rectifier, a meter connected across the bridge, an electrical connection including a condenser between the plate and bridge, a source of rectified current for the plate, a choke coil connected between said source and plate, and means for applying to said grid a pulsating voltage of predetermined magnitude and obtained from said source of rectified current.

2. A system for testing a tube having a grid and plate, said system comprising a bridge circuit including resistors and a rectifier, a meter connected across the bridge between one of the resistors and the rectifier, said bridge being connected between said plate and ground, a source of rectified current for said plate, means for applying a pulsating voltage of predetermined magnitude and obtained from said source of rectified current to said grid, and means for applying the resulting plate current pulsations through said rectifier to said meter.

3. A circuit for testing tubes having a grid and plate, said circuit comprising a bridge circuit, two arms of which are composed of resistors, the other two arms being constituted of a multi-disk rectifier, a meter connected between the junction of the resistor arms and an intermediate disk of the rectifier, an electrical connection between the plate of the tube under test and the junction of one of said resistors with an end disk terminal of the rectifier, the junction of the other of said resistors with the other end disk terminal of the rectifier being connected to ground, a source of rectified alternating current for the plate of the tube under test, and means for applying variable impulses of predetermined magnitude and obtained from said source of rectified alternating current to said grid.

4. A circuit for testing tubes having a grid and plate, said circuit comprising a bridge circuit, two arms of which are composed of resistors, the other two arms being constituted of a multi-disk rectifier, a meter connected between the junction of the resistor arms and an intermediate disk of the rectifier, an electrical connection between the plate of the tube under test and the junction of one of said resistors with an end disk terminal of the rectifier, the junction of the other of said resistors with the other end disk terminal of the rectifier being connected to ground, a source of rectified alternating current for the plate of the tube under test, and means including a condenser between the plate of the tube under test and the bridge circuit for preventing direct current voltage from reaching the meter.

5. A circuit for testing tubes having a grid and plate, said circuit comprising a bridge including a rectifier, a meter connected across the bridge, an electrical connection including a condenser between said plate and the bridge, a source of rectified alternating current for said plate, means for applying a variable potential of predetermined magnitude obtained from said source of rectified alternating current to said grid, said condenser serving to prevent the direct current component of the plate current from reaching the meter but to permit the alternating component of the plate current to reach the rectifier and to pass on to the meter, and means including a resistor connected between the bridge and ground for calibrating said meter.

6. A system for testing a tube having a control grid, an auxiliary grid and a plate, said system comprising a bridge circuit including resistors and a rectifier of the multi-disk solid type, a source of rectified alternating current connected to ground, a connection from the plate to said source through a choke coil, a connection from the plate to an end terminal disk of the rectifier through a condenser, a meter connected across the bridge and between one of said resistors and an intermediate disk terminal of the rectifier, the remaining end terminals of the rectifier being connected to ground, and connections from said source of rectified alternating current to each of said control and auxiliary grids.

FLOYD E. WENGER.